United States Patent
Berry

(10) Patent No.: US 12,453,421 B1
(45) Date of Patent: *Oct. 28, 2025

(54) POST COUPLER WITH POST ALIGNMENT TAB

(71) Applicant: Jaken Co., Inc., Tustin, CA (US)

(72) Inventor: Christopher Berry, Coto de Caza, CA (US)

(73) Assignee: Jakes Co., Inc., Tustin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/773,893

(22) Filed: Jul. 16, 2024

Related U.S. Application Data

(63) Continuation of application No. 18/296,110, filed on Apr. 5, 2023, now Pat. No. 12,096,855.

(51) Int. Cl.
| | |
|---|---|
| A47B 96/14 | (2006.01) |
| A47B 87/02 | (2006.01) |
| A47B 47/00 | (2006.01) |

(52) U.S. Cl.
CPC ........ *A47B 96/145* (2013.01); *A47B 87/0215* (2013.01); *A47B 47/00* (2013.01);
(Continued)

(58) Field of Classification Search
CPC ... A47B 96/145; A47B 87/0215; A47B 47/00; A47B 47/0083; A47B 96/1458; A47B 57/50; A47B 96/1475; A47B 47/021; A47B 96/1408; A47B 96/1441; A47B 87/0246; Y10T 403/50; Y10T 403/55; Y10T 403/42; Y10T 403/73; Y10T 403/551; Y10T 403/555; Y10T 403/4602
See application file for complete search history.

(56) References Cited

U.S. PATENT DOCUMENTS

| | | | |
|---|---|---|---|
| 1,458,666 | A | 6/1923 | Stoppello |
| 1,558,154 | A | 10/1925 | Fitch |
| (Continued) | | | |

FOREIGN PATENT DOCUMENTS

| | | |
|---|---|---|
| CN | 2200718 | 6/1995 |
| CN | 1707125 | 12/2005 |
| (Continued) | | |

OTHER PUBLICATIONS

Borroughs Corporation. High Rise Post Splice. Publication date is at least as early as Oct. 5, 2022.
(Continued)

*Primary Examiner* — Devin K Barnett
(74) *Attorney, Agent, or Firm* — Concourse Law Group; Katherine B. Sales, Esq.

(57) ABSTRACT

A post coupler having a first body portion and a second body portion. Each body portion having an inner edge, an outer edge, a reverse flange, and at least one post alignment tab. Each reverse flange forms a post receiving slot. The first and second body portions are coupled to each other at approximately 90 degrees. A method of using the post coupler comprises the steps of a) providing a first post section and a second post section, b) inserting the first post section along the post receiving slots until the first notch interacts with the tab, and c) inserting the second post section along the post receiving slots until the second notch interacts with the tab.

14 Claims, 4 Drawing Sheets

(52) U.S. Cl.
CPC ......... *A47B 47/0083* (2013.01); *Y10T 403/50* (2015.01); *Y10T 403/55* (2015.01)

(56) References Cited

U.S. PATENT DOCUMENTS

| | | | |
|---|---|---|---|
| 2,226,763 A | 12/1940 | Geib et al. | |
| 2,296,336 A | 9/1942 | Crozier et al. | |
| 2,367,206 A | 1/1945 | Davis | |
| 2,827,254 A | 3/1958 | Faber | |
| 2,939,589 A * | 6/1960 | Bellon | F16B 12/50 108/147.15 |
| 3,056,507 A | 10/1962 | Balfanze, Jr. | |
| 3,481,486 A | 12/1969 | Squires | |
| RE27,200 E | 10/1971 | Ferdinand et al. | |
| 3,749,343 A * | 7/1973 | Marschak | F16B 12/50 248/188 |
| 3,788,001 A | 1/1974 | Balfanz, Jr. | |
| 4,102,276 A | 7/1978 | Roveroni | |
| 4,167,353 A * | 9/1979 | Gebhardt | F16B 12/50 403/231 |
| 4,598,512 A | 7/1986 | Chapman | |
| 4,727,815 A | 3/1988 | Miller | |
| 4,967,916 A | 11/1990 | Handler et al. | |
| 5,350,073 A * | 9/1994 | Thornley | A47B 57/22 211/187 |
| 5,395,093 A | 3/1995 | Chrisman | |
| 5,423,576 A | 6/1995 | Hunter | |
| 5,425,520 A | 6/1995 | Masumoto | |
| 5,463,966 A * | 11/1995 | Nilsson | F16B 12/34 108/193 |
| 5,553,549 A * | 9/1996 | Nilsson | A47B 9/00 108/147.11 |
| 5,772,186 A | 6/1998 | Parker | |
| 5,971,175 A | 10/1999 | Bustos | |
| 6,209,155 B1 | 4/2001 | Epstein et al. | |
| 6,397,413 B2 | 6/2002 | Epstein et al. | |
| 6,681,705 B2 | 1/2004 | Wetterberg | |
| 6,839,920 B2 | 1/2005 | Schulte | |
| D528,669 S | 9/2006 | Zarb | |
| 7,128,225 B2 * | 10/2006 | Saltzburg | A47B 96/1441 211/187 |
| 7,497,054 B2 | 3/2009 | Takeuchi et al. | |
| D690,189 S * | 9/2013 | Wojtowicz | D8/394 |
| D690,582 S * | 10/2013 | Wojtowicz | D8/394 |
| D693,668 S | 11/2013 | Wojtowicz et al. | |
| 8,585,313 B2 | 11/2013 | Wojotowicz et al. | |
| 8,632,272 B2 | 1/2014 | Wojtowicz et al. | |
| 8,672,577 B2 | 3/2014 | Wojtowicz et al. | |
| 8,714,864 B2 * | 5/2014 | Wojtowicz | A47F 5/14 403/109.8 |
| D708,051 S | 7/2014 | Wojtowicz et al. | |
| 9,439,508 B2 | 9/2016 | Wojtowicz et al. | |
| 9,474,369 B1 * | 10/2016 | Tsai | A47B 87/02 |
| 9,723,925 B1 * | 8/2017 | Tsai | A47B 45/00 |
| 10,626,905 B1 * | 4/2020 | Chiu | A47B 57/545 |
| 10,694,849 B2 | 6/2020 | Liss et al. | |
| 11,064,806 B1 * | 7/2021 | Ge | A47B 87/0207 |
| 11,083,289 B2 * | 8/2021 | Németh | A47B 87/0215 |
| 11,202,502 B1 * | 12/2021 | Berry | A47B 47/0083 |
| 11,241,092 B1 * | 2/2022 | Liu | F16B 7/042 |
| D949,002 S * | 4/2022 | Parab | D8/394 |
| D949,003 S * | 4/2022 | Parab | D8/394 |
| D949,004 S | 4/2022 | Parab | |
| D967,986 S | 10/2022 | Brennan | |
| 11,490,730 B2 | 11/2022 | Liss et al. | |
| 11,627,800 B2 * | 4/2023 | Carrasco López | A47B 57/34 211/187 |
| D1,028,684 S | 5/2024 | Yoon | |
| 2001/0044961 A1 | 11/2001 | Epstein | |
| 2002/0171338 A1 | 11/2002 | Wetterberg | |
| 2006/0163438 A1 * | 7/2006 | Wojotowicz | A47F 5/14 248/300 |
| 2011/0272373 A1 * | 11/2011 | Wojtowicz | A47B 96/1458 248/218.4 |
| 2011/0272541 A1 * | 11/2011 | Wojtowicz | A47F 5/14 248/218.4 |
| 2011/0272542 A1 * | 11/2011 | Wojtowicz | A47B 87/0215 248/218.4 |
| 2011/0272543 A1 | 11/2011 | Wojtowicz | |
| 2015/0282613 A1 | 10/2015 | Chen | |
| 2017/0208936 A1 | 7/2017 | Tsai | |
| 2017/0208939 A1 | 7/2017 | Tsai | |
| 2017/0211604 A1 | 7/2017 | Tsai | |
| 2019/0059588 A1 * | 2/2019 | Liss | A47B 96/1408 |
| 2024/0117831 A1 | 4/2024 | Berry | |

FOREIGN PATENT DOCUMENTS

| | | |
|---|---|---|
| CN | 101643051 | 2/2010 |
| CN | 103053229 | 4/2013 |
| CN | 103392045 | 11/2013 |
| CN | 105889274 | 8/2016 |
| DE | 3713167 | 11/1988 |
| DE | 29808396 | 8/1998 |
| EP | 0063805 | 11/1982 |
| EP | 0808589 | 11/1997 |
| EP | 0981979 | 3/2000 |
| JP | 2002253353 | 9/2002 |
| KR | 300771287.0000 | 11/2014 |
| WO | WO2009035245 | 3/2009 |

OTHER PUBLICATIONS

Borroughs Corporation. Post Splicer. Publication date is at least as early as Oct. 5, 2022.

Dexion webpage re its Speedlock Upright Splice 100mm, downloaded on Jul. 8, 2022—https://www.dexion.com.au/product/speedlock-upright-splice-100mm/.

Unarco Post Extensions—Retail Rack Dictionary, downloaded on Jul. 8, 2022—https://www.unarcorack.com/retail-rack/retail-dictionary-a/retail-rack-dictionary-p/.

WPRP Wholesale blog entry "Can Rivit Shelving be Spliced," downloaded on Jul. 8, 2022—https://www.wprpwholesalepalletrack.com/can-rivit-shelving-be-spliced-wholesale-pallet-r.

Post Splice. BuyMetalShelving.com. SKU: BSPs5. Publication date is at least as early as Oct. 5, 2022.

* cited by examiner

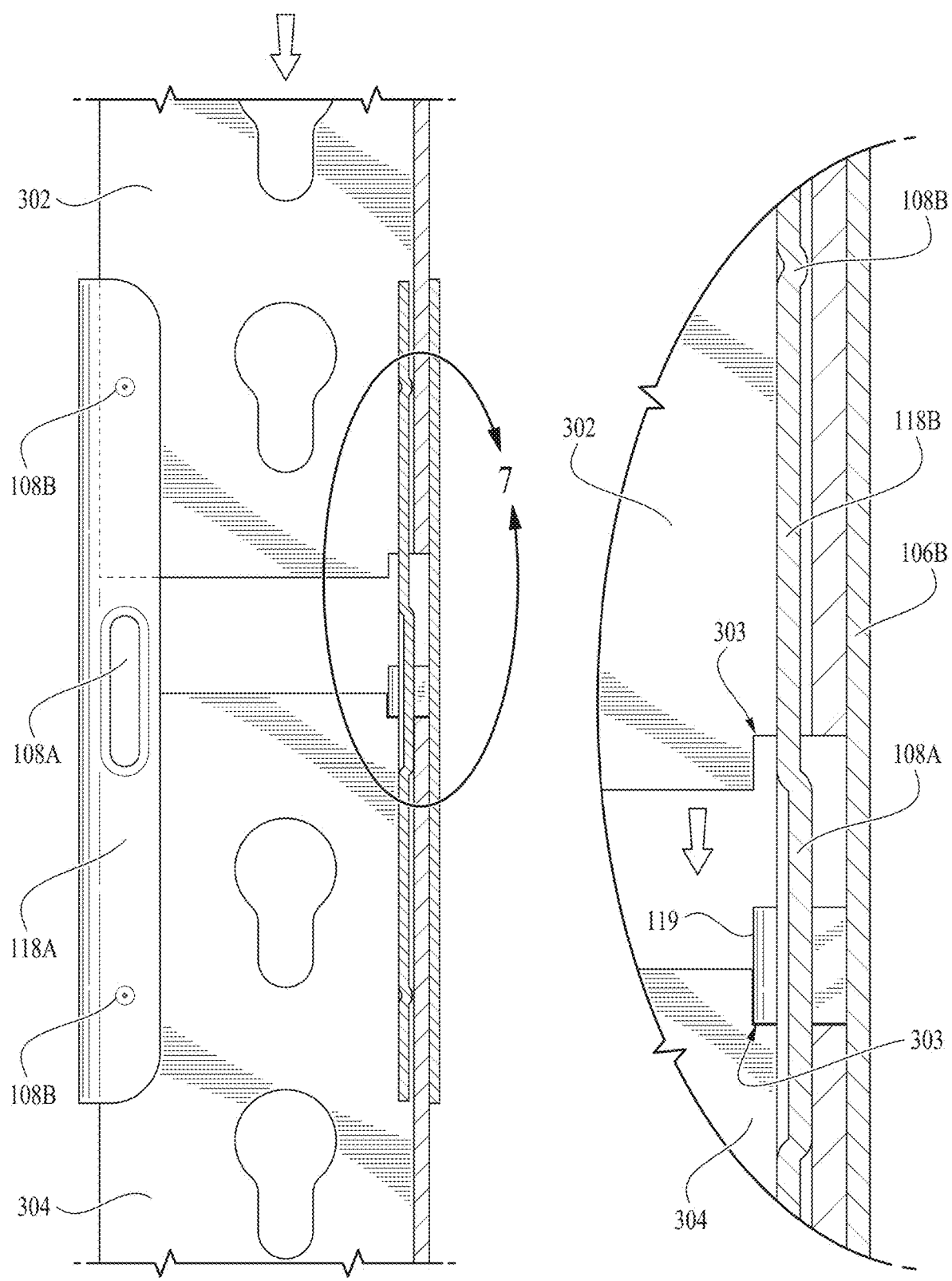

POST COUPLER WITH POST ALIGNMENT TAB

CROSS-REFERENCE TO RELATED APPLICATIONS

This application is a continuation of U.S. patent application Ser. No. 18/296,110, titled "POST COUPLER WITH POST ALIGNMENT TAB," filed Apr. 5, 2023, the contents of which are incorporated by reference herein in their entirety.

BACKGROUND

Storage racks and shelving that be assembled and dissembled by a user have become popular. However, there are notable limitations with respect to known storage racks, including a large number of parts and being difficult to assemble. In particular, the post couplers used to connect one or more support posts together can be cumbersome to use, or use a large amount of material, making them expensive to manufacture.

Accordingly, there is a need for an improved post coupler.

SUMMARY

In a first embodiment, the invention described herein is directed to a post coupler comprising a first body portion, a second body portion, and at least one post alignment tab.

The first body portion has a first reverse flange coupled to the first body portion forming a first post receiving slot.

The second body portion has a second reverse flange coupled to the second body portion forming a second post receiving slot, wherein the first and second body portions are coupled to each other along one side.

The at least one post alignment tab is configured to interact with at least one post section having at least one notch.

The post coupler can have a top end portion and a bottom end portion, wherein the top end portion and the bottom end portion are opposed to each other.

Optionally, the first body portion has a first inner edge and a first outer edge, and the second body portion has a second inner edge and a second outer edge, and the second inner edge is coupled to the first inner edge of the first body portion at approximately 90 degrees to the first body portion.

Optionally, each reverse flange has at least one protrusion thereon.

In a second embodiment, the present invention is directed to a method of using the post coupler. The method comprises the steps of:
a) providing a first post section having a first notch and a second post section having a second notch;
b) inserting the first post section into one end portion of the post coupler along the first and second post receiving slots until the first notch interacts with the tab; and
c) inserting the second post section into the opposed end portion of the post coupler, along the first and second post receiving slots until the second notch interacts with the tab.

BRIEF DESCRIPTION OF DRAWINGS

These and other features, aspects, and advantages of the present invention will become better understood with regard to the following description, appended claims, and accompanying drawings.

FIG. 6 is a sectional view of a post coupler of FIG. 1, wherein a bottom post has been inserted into one end of the post coupler and is in contact with two post stops of the post coupler, and a top post is being slid into an other end of the post coupler; and FIG. 7 is an enlarged, detailed view of a portion of the post coupler and top post of FIG. 6, taken along line 7-7.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and using the invention in connection with the illustrated embodiments. It is to be understood, however, that the same or equivalent functions and sequences may be accomplished by different embodiments that are also intended to be encompassed within the spirit and scope of the invention.

Figures 1, 2:
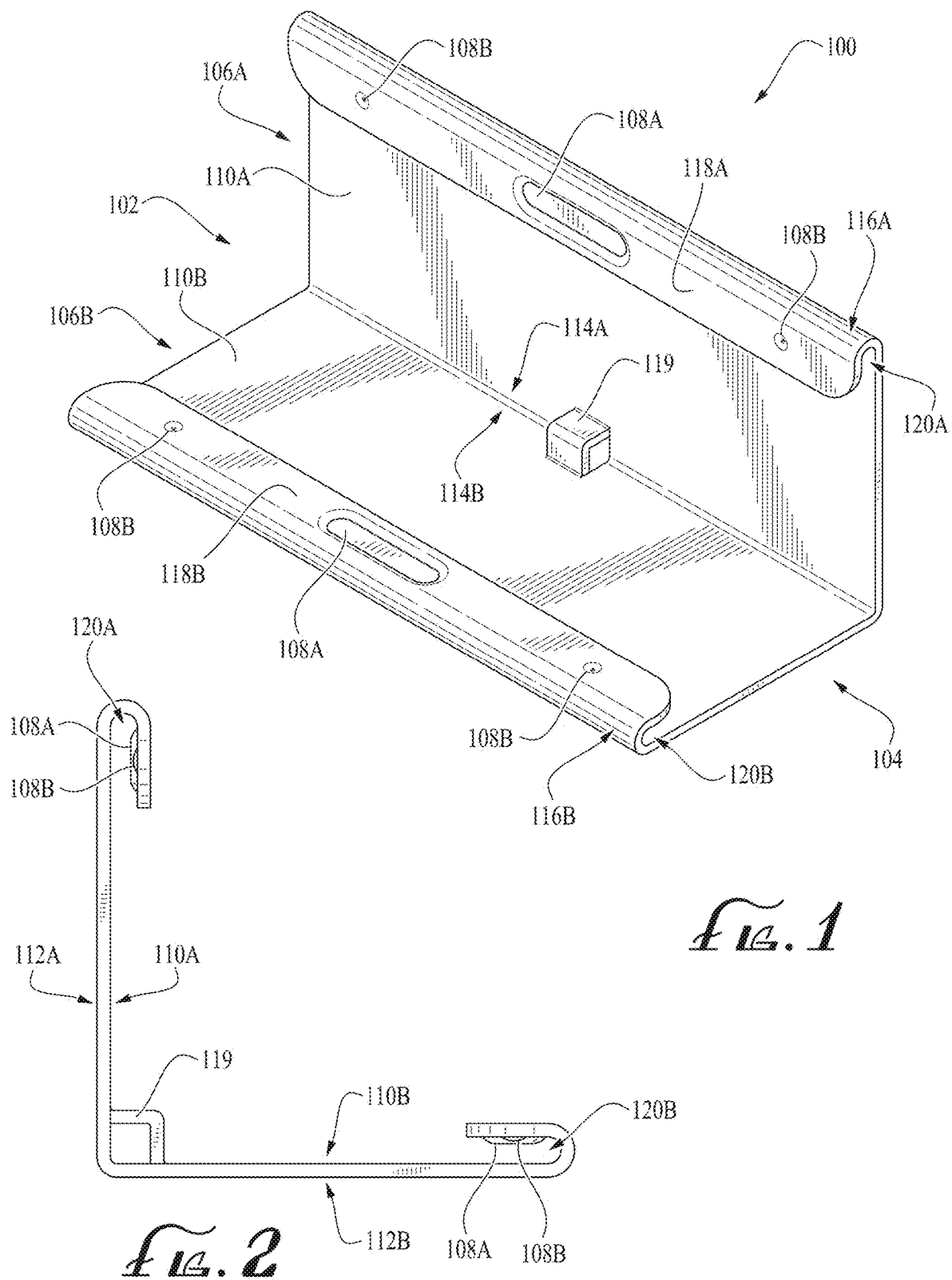
FIG. 1 a perspective view of a post coupler having features of the present invention.
FIG. 2 is a top plan view of the post coupler of FIG. 1.

Referring now to FIGS. 1 and 2, there is shown a post coupler 100 having features of the present invention. The post coupler 100 has a top end portion 102, an opposed bottom end portion 104, a first body portion 106A and a second body portion 106B. The use of the terms "top" and "bottom" are not limiting and are used simply for ease of reference when the post coupler 100 is being used to form a single post.

Each body portion 106A, 106B has an inside surface 110A, 110B, an outside surface 112A, 112B, an inner edge 114A, 114B, an outer edge 116A, 116B, a reverse flange 118A, 118B and at least one post alignment tab 119. The post alignment tab 119 can be placed anywhere along the post coupler 100, however, preferably, the tab 119 is centered along the length of the inner edges 114A, 114B of the body portions 106A, 106B. The tab 119 is formed by cutting a portion of the body portions 110A, 110B along their inner edges 114A, 114B and bending it inwards. As such, the tab 119 is integral with the coupler 100. Optionally, the tab 119 is an extension that is welded on to, or coupled to the coupler 100 as opposed to being an integral piece of the coupler 100.

The first body portion 106A is coupled to the second body portion 106B along their respective inner edges 114A, 114B. Preferably, the first body portion 106A and the second body portion 106B are at an approximate right angle, or 90 degrees, from each other. Optionally, the body portions 106A, 106B can be at any angle with respect to each other in order to accommodate different shaped post portions 302, 304.

Each reverse flange 118A, 118B is coupled to the outer edge 116A, 116B of its respective body portion 106A, 106B, thereby forming two post receiving slots 120A, 120B that extend the length of each reverse flange 118A, 118B.

Optionally, each reverse flange 118A, 118B comprises at least one first protrusion 108A along its center that applies pressure to a post section 302, 304 inserted along the slots 120A, 120B. The first protrusions 108A can be any shape, but preferably are elongated oval shaped as shown in the drawings.

Preferably, there are at least two additional protrusions 108B on each reverse flange 118A, 118B, to apply additional pressure along both post sections 302, 304 inserted therein. The two additional protrusions 108B can be any shape, but preferably are roughly circular/dome shaped as shown in drawings.

The protrusions 108A, 108B are formed by pushing a portion of the reverse flange 118 inward, towards the body portion 106, thereby forming a recess on an outer surface of the reverse flange 118, and a protrusion 108 on an inside surface of the reverse flange 118.

Referring now to FIGS. 3 through 7, a system comprising at least one post coupler 100 and at least two post sections 302, 304 can be seen, and the function of the alignment tab 119 is shown.

Figure 3:
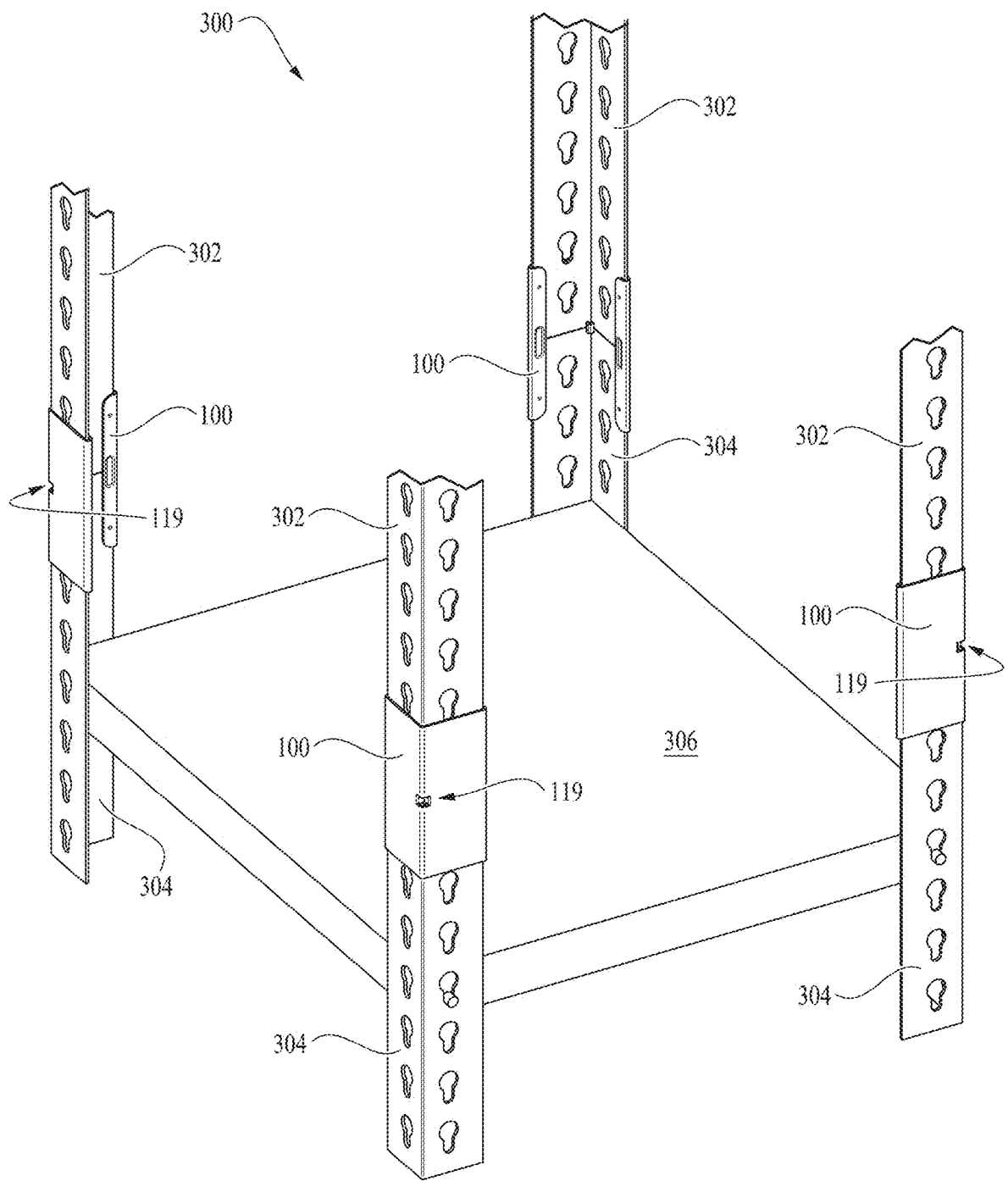
FIG. 3 is a perspective view of a plurality of post couplers of FIG. 1 installed to form a shelving system.

FIG. 3 shows a typical rack/shelving system 300, wherein four post couplers 100 and eight post portions 302, 304 are utilized to support at least one shelf 306.

Figure 4:
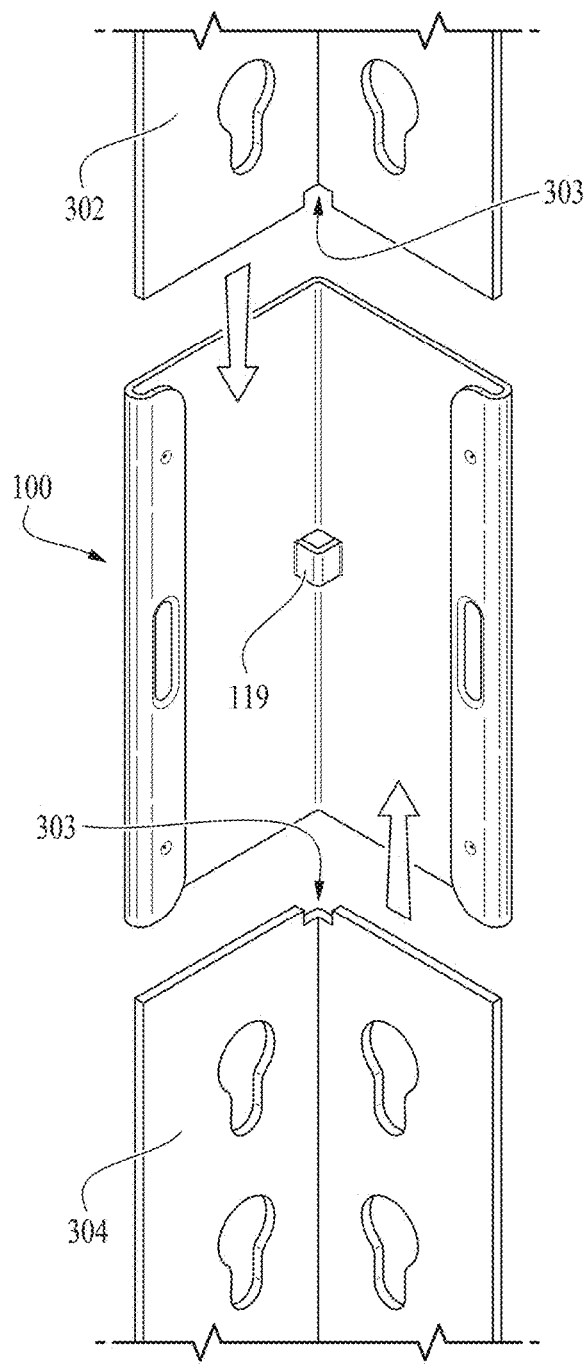
FIGS. 4 and 5 are enlarged, detailed views of steps involved in coupling two posts together using the post coupler of FIG. 1.
Figure 5:
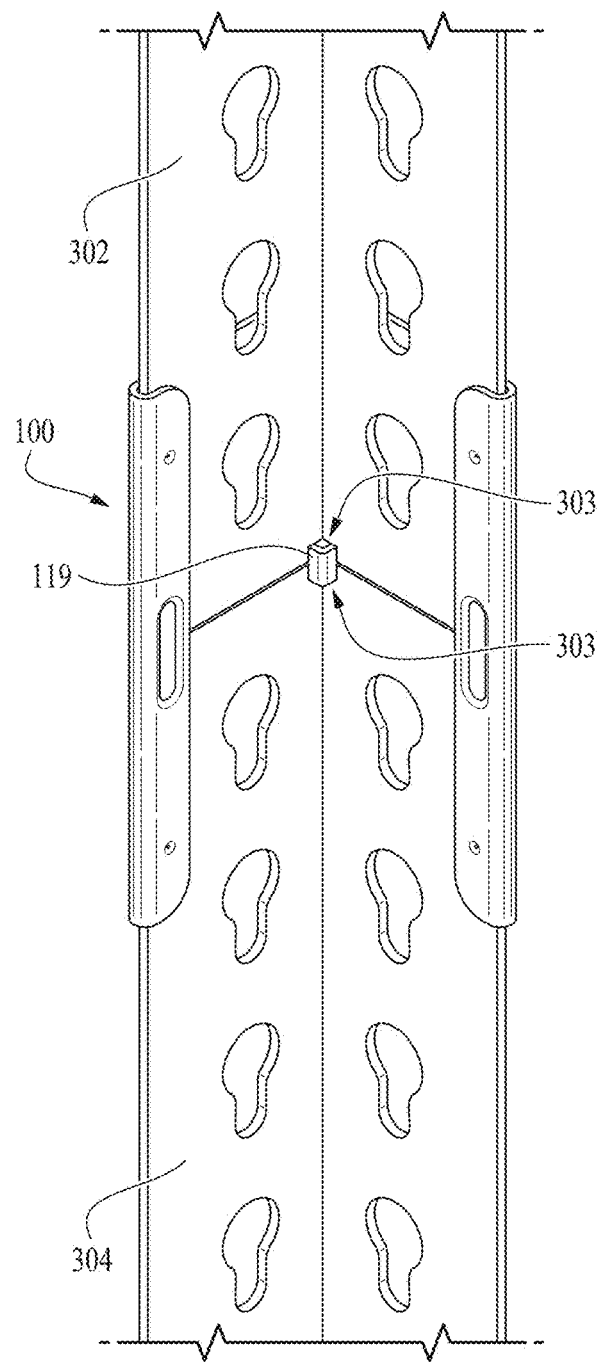

FIGS. 4 and 5 show the progression of inserting two post sections 302, 304 into their respective post receiving slots 120A, 120B. One post section 302, 304 is inserted into each end portion 102, 104 of the coupler 100, and the edges of the post sections 302, 304 slide down the slots 120A, 120B until they align with the alignment tab 119.

The tab 119 is configured to interact with notches 303 in the post sections 302, 304 so that the post sections 302, 304 remain aligned within the post coupler 100 and their ability to shift or change their positioning within the post coupler 100 is restricted.

As shown in the drawings, each post section 302, 304 has two opposed ends, and each end has a notch 303 centered along each end. The notch 303 is specifically designed to interact and mate with the tab 119 of a coupler 100. When vertical, downward pressure/weight is applied to the post sections 302, 304 that are retained within a coupler 100, the intersection between the tab 119 and the notches 303 provides added stability to the system so that post sections 302, 304 cannot shift within the post coupler 100 and move out of position. This allows the system to support a large amount of weight, and increases the level of safety that the system can achieve, as failure under large amounts of weight is reduced.

FIGS. 6 and 7 show detailed, sectional views of the post sections 302, 304 insertion into a coupler 100. The notches 303 in the post sections 302, 304 align with the alignment tab 119, and the protrusions 108A, 108B apply pressure against the post section 302, performing a gripping function. This application of pressure/gripping can be seen in FIG. 7.

The post coupler 100 can be made from any material including but not limited to metal, plastic or a composite material such as carbon fiber. Optionally, the post coupler 100 is made from steel.

While not necessary, preferably, the coupler 100 is formed from a single piece of material that has its sides bent to form the reverse flanges 118, and is then bent in half again, at an angle, to form the body portions 106A, 106B. Alignment tab 119 is then cut and bent therefrom. Optionally, each component of the coupler 100 is formed from a separate piece of material that is then coupled together by welding or some other form of physical coupling.

A method of using the post coupler 100 comprises the steps of:
a) providing a first post section 302 and a second post section 304;
b) inserting the first post section 302 into one end portion of the post coupler 100 along the first and second post receiving slots 120A, 120B until the notch 303 of the first post section 302 abuts aligns with tab 119; and
c) inserting the second post section 304 into the opposed end portion of the post coupler 100, along the first and second post receiving slots 120A, 120B until the notch 303 of the second post section 304 aligns with tab 119.

Optionally, the second post section 304 is inserted into the post coupler 100 first, and then the first post section 302 is inserted into the post coupler 100, and as such, the use of the terms "first post section" and "second post section" are not limiting to their specific order of insertion.

The post coupler 100 of the present invention has the advantage that no extra material is required to form the alignment tab 119. As such, the post coupler 100 utilizes less material than the post couplers of the prior art, making it cheaper to manufacture.

Additionally, tab 119 is configured for use with post sections 302, 304 that have notches 303 which are specifically designed for interaction with the tab 119. The combination of the notches 303 and the tab 119 ensure that the post sections 302, 304 cannot shift their position when inside the post coupler 100.

The foregoing description of the preferred embodiment(s) of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A combination comprising:
    a) a post coupler comprising:
        aa) a first body portion having:
            i) a first inner edge;
            ii) a first outer edge; and
            iii) a first reverse flange coupled to the first outer edge, forming a first post receiving slot;
        bb) a second body portion having:
            i) a second inner edge coupled to the first inner edge of the first body portion;
            ii) a second outer edge; and
            iii) a second reverse flange coupled to the second outer edge, forming a second post receiving slot;
        cc) at least one post alignment tab comprising:
            i) a first tab member; and
            ii) a second tab member;
                wherein the first tab member is integrally connected to the first body portion and the second tab member, and the second tab member is integrally connected to the first tab member and the second body portion; and
        dd) an aperture is between an interior surface of the first body portion and an interior surface of the second tab member and the aperture is between an interior surface of the second body portion and an interior surface of the first tab member; and
    b) at least one post section comprising:
        aa) two opposed ends; and
        bb) at least one notch centered along at least one of the opposed ends, each of the at least one notch is configured to interact with one of the at least one post alignment tab of one of the at least one post coupler.

2. The combination of claim 1, wherein the at least one post alignment tab is configured to engage a first post section above the at least one post alignment tab and the at least one post alignment tab is configured to engage a second post section below the at least one post alignment tab.

3. The combination of claim 1, wherein the post coupler is configured to couple the first post section to the second post section.

4. The combination of claim 1, wherein the first tab member has a first side portion and a second side portion; and the second tab member has a third side portion and a fourth side portion.

5. The combination of claim 4, wherein the first side portion of the first tab member is integrally connected to the first body portion and the second side portion of the first tab member is integrally connected to the second tab member, and the third side portion of the second tab member is integrally connected to the second side portion of the first tab member and the fourth side portion of the second tab member is integrally connected to the second body portion.

6. The combination of claim 1, wherein each reverse flange has at least one protrusion thereon.

7. A combination comprising:
   a) a post coupler comprising:
      aa) a first body portion having a first reverse flange forming a first post receiving slot;
      bb) a second body portion having a second reverse flange forming a second post receiving slot;
      cc) at least one post alignment tab comprising:
         i) a first tab member; and
         ii) a second tab member;
         wherein the first tab member is integrally connected to the first body portion and the second tab member, and the second tab member is integrally connected to the first tab member and the second body portion; and
      dd) an aperture is between an interior surface of the first body portion and an interior surface of the second tab member and the aperture is between an interior surface of the second body portion and an interior surface of the first tab member; and
   b) at least one post section comprising:
      aa) two opposed ends; and
      bb) at least one notch centered along at least one of the opposed ends, each of the at least one notch is configured to interact with one of the at least one post alignment tab of one of the at least one post coupler.

8. The combination of claim 7, wherein the at least one post alignment tab is configured to engage a first post section above the at least one post alignment tab and the at least one post alignment tab is configured to engage a second post section below the at least one post alignment tab.

9. The combination of claim 7, wherein the post coupler is configured to couple the first post section to the second post section.

10. The combination of claim 7, wherein the first tab member has a first side portion and a second side portion; and the second tab member has a third side portion and a fourth side portion.

11. The combination of claim 7, wherein the first side portion of the first tab member is integrally connected to the first body portion and the second side portion of the first tab member is integrally connected to the second tab member, and the third side portion of the second tab member is integrally connected to the second side portion of the first tab member and the fourth side portion of the second tab member is integrally connected to the second body portion.

12. The combination of claim 7, wherein each reverse flange has at least one protrusion thereon.

13. A method comprising the steps of:
   a) providing the post coupler of claim 1;
   b) providing a first post section having a first notch;
   c) providing a second post section having a second notch;
   d) inserting the first post section into a top end portion of the post coupler along the first and second post receiving slots until the first notch interacts with the at least one post alignment tab; and
   e) inserting the second post section into a bottom end portion of the post coupler, along the first and second post receiving slots until the second notch interacts with the at least one post alignment tab.

14. A method comprising the steps of:
   f) providing the post coupler of claim 7;
   g) providing a first post section having a first notch;
   h) providing a second post section having a second notch;
   i) inserting the first post section into a top end portion of the post coupler along the first and second post receiving slots until the first notch interacts with the at least one post alignment tab; and
   j) inserting the second post section into a bottom end portion of the post coupler, along the first and second post receiving slots until the second notch interacts with the at least one post alignment tab.

\* \* \* \* \*